US008099415B2

(12) United States Patent
Luo et al.

(10) Patent No.: US 8,099,415 B2
(45) Date of Patent: Jan. 17, 2012

(54) METHOD AND APPARATUS FOR ASSESSING SIMILARITY BETWEEN ONLINE JOB LISTINGS

(75) Inventors: Tong Luo, Mountain View, CA (US); Peter Michael Weck, Atherton, CA (US); Antony Sequeira, San Mateo, CA (US); Neelesh Tendulkar, San Jose, CA (US); Shai Bentov, Sunnyvale, CA (US); James Douglas Levine, Mountain View, CA (US)

(73) Assignee: Simply Hired, Inc., Sunnyvale, CA (US)

( * ) Notice: Subject to any disclaimer, the term of this patent is extended or adjusted under 35 U.S.C. 154(b) by 761 days.

(21) Appl. No.: 11/530,432

(22) Filed: Sep. 8, 2006

(65) Prior Publication Data

US 2008/0065630 A1 Mar. 13, 2008

(51) Int. Cl.
*G06F 17/30* (2006.01)
*G06F 7/00* (2006.01)
(52) U.S. Cl. ........................ 707/736; 707/758
(58) Field of Classification Search .......... 707/6, 999.6, 707/758, 736
See application file for complete search history.

(56) References Cited

U.S. PATENT DOCUMENTS

| 4,991,087 | A | * | 2/1991 | Burkowski et al. | 707/3 |
| 5,283,731 | A | * | 2/1994 | Lalonde et al. | 705/1.1 |
| 5,319,779 | A | * | 6/1994 | Chang et al. | 707/3 |
| 5,826,258 | A | * | 10/1998 | Gupta et al. | 707/4 |
| 5,832,497 | A | * | 11/1998 | Taylor | 707/104.1 |
| 5,974,481 | A | * | 10/1999 | Broder | 710/49 |
| 5,978,768 | A | * | 11/1999 | McGovern et al. | 705/1 |
| 5,999,937 | A | * | 12/1999 | Ellard | 1/1 |
| 6,081,805 | A | * | 6/2000 | Guha | 1/1 |
| 6,438,539 | B1 | * | 8/2002 | Korolev et al. | 707/3 |
| 6,658,423 | B1 | * | 12/2003 | Pugh et al. | 1/1 |
| 6,917,952 | B1 | * | 7/2005 | Dailey et al. | 707/203 |
| 7,139,756 | B2 | * | 11/2006 | Cooper et al. | 707/6 |
| 2001/0032112 | A1 | * | 10/2001 | Linz | 705/8 |
| 2002/0016730 | A1 | * | 2/2002 | Foulger et al. | 705/10 |
| 2002/0023042 | A1 | * | 2/2002 | Solomon | 705/37 |
| 2002/0052928 | A1 | * | 5/2002 | Stern et al. | 709/218 |
| 2002/0062222 | A1 | * | 5/2002 | Gupta et al. | 705/1 |

(Continued)

OTHER PUBLICATIONS

Chaudhuri, Surajit, et al., "Robust and Efficient Fuzzy Match for Online Data Cleaning", SIGMOD 2003, San Diego, CA, Jun. 9-12, 2003, pp. 313-324.*

(Continued)

*Primary Examiner* — Robert Stevens
(74) *Attorney, Agent, or Firm* — Haynes and Boone, LLP

(57) ABSTRACT

Job listings retrieved from external sources are pre-processed prior to being stored in the search engine production database and duplicate records identified prior to storage in a production database for the search engine. Inter-source and intra-source hash values are calculated for each job listing and the values compared. Job listings having the same intra-source hash are judged to be duplicates of each other. Descriptions whose intra-source hash values do not match, but whose inter-source hash values match are judged to be duplicate candidates and subject to further processing. Suffixes for each such record are stored to a data structure such as a suffix array and the records searched and compared based on the suffix arrays. Records having a pre-determined number of contiguous words in common are judged to be duplicates. Duplicate records are identified before the data set is stored to the production data base.

18 Claims, 7 Drawing Sheets

U.S. PATENT DOCUMENTS

| | | | |
|---|---|---|---|
| 2002/0062312 A1* | 5/2002 | Gupta et al. | 707/3 |
| 2002/0073099 A1* | 6/2002 | Gilbert et al. | 707/104.1 |
| 2002/0073138 A1* | 6/2002 | Gilbert et al. | 709/201 |
| 2003/0172066 A1* | 9/2003 | Cooper et al. | 707/7 |
| 2005/0055334 A1* | 3/2005 | Krishnamurthy | 707/2 |
| 2005/0055343 A1* | 3/2005 | Krishnamurthy | 707/3 |
| 2005/0171863 A1* | 8/2005 | Hagen | 705/26 |
| 2005/0182773 A1* | 8/2005 | Feinsmith | 707/100 |
| 2006/0020611 A1* | 1/2006 | Gilbert et al. | 707/100 |
| 2006/0106629 A1* | 5/2006 | Cohen et al. | 705/1 |
| 2006/0206448 A1* | 9/2006 | Hyder et al. | 707/1 |
| 2006/0206505 A1* | 9/2006 | Hyder et al. | 707/100 |
| 2006/0206584 A1* | 9/2006 | Hyder et al. | 709/218 |
| 2006/0212466 A1* | 9/2006 | Hyder et al. | 707/101 |
| 2006/0229899 A1* | 10/2006 | Hyder et al. | 705/1 |
| 2007/0239777 A1* | 10/2007 | Toomey | 707/104.1 |
| 2007/0271109 A1* | 11/2007 | Wang et al. | 705/1 |
| 2007/0273909 A1* | 11/2007 | Chen et al. | 358/1.13 |
| 2007/0282591 A1* | 12/2007 | Peng | 704/3 |
| 2007/0288308 A1* | 12/2007 | Chen et al. | 705/14 |
| 2007/0299818 A1* | 12/2007 | Toomey et al. | 707/3 |
| 2008/0140710 A1* | 6/2008 | Dedhia et al. | 707/104.1 |

OTHER PUBLICATIONS

Dasu, Tamraparni, et al., "Mining Database Structure: Or, How to Build a Data Quality Browser", ACM SIGMOD 2002, Madison, WI, Jun. 4-6, 2002, pp. 240-251.*

Patridge, Charles, "The Fuzzy Feeling SAS® Provides: Electronic Matching of Records without Common Keys", Observations: The Technical Journal for SAS Software Users, © 1998, pp. 1-34.*

Cohen, Jonathan D., "Hardware-Assisted Algorithm for Full-Text Large-Dictionary String Matching Using N-Gram Hashing", Information Processing & Management, vol. 34, Issue 4, Jul. 1998, pp. 443-464.*

Rajaraman, Anand, et al., "Virtual Database Technology: Transforming the Internet into a Database", IEEE Internet Computing, vol. 2, Issue 4, Jul./Aug. 1998, pp. 55-58.*

Forman, George, et al., "Finding Similar Files in Large Document Repositories", KDD '05, Chicago, IL, Aug. 21-24, 2005, pp. 394-400.*

Somers, Harold, et al., "Multilingual Generation and Summarization of Job Adverts: the TREE Project", ANLC '97, Proc. of the 5th Conf. on Applied Natural Language Processing, Stroudsburg, PA, Association for Computational Linguistics, © 1997, pp. 269-276.*

Boitsov, L. M., "Using Signature Hashing for Approximate String Matching", Computational Mathematics and Modeling, vol. 13, No. 3, © 2002, pp. 314-326.*

Stein, Benno, et al., "Near Similarity Search and Plagiarism Analysis", From Data and Information Analysis to Knowledge Engineering, Proc. of the 29th Annual Conf. of the Gesellschaft fur Klassifikation e. V., Univ. of Magdeburg, Mar. 9-11, 2005, pp. 430-437.*

Cooper, James W., et al., "Detecting Similar Documents Using Salient Terms", CIKM '02, McLean, VA, Nov. 4-9, 2002, pp. 245-251.*

Tavakoli, Nassrin, et al., "A Multilevel Signature Approach for Retrieval of Unformed Data", 1989 Southeastcon Proceedings, © IEEE 1989, pp. 1316-1320.*

"Collision (computer science)", Wikipedia, downloaded from: en.wikipedia.org/wiki/Hash_collision, Mar. 2011, one page.*

Yang, Xu, et al., "Organizing and Accessing Web Services on Air", IEEE Transactions on Systems, Man and Cybernetics—Part A: systems and Humans, vol. 33, No. 6, Nov. 2003, pp. 742-756.*

"Suffix array", Wikipedia, downloaded from: en.wikipedia.org/wiki/Hash_collision, Mar. 2011, pp. 1-4.*

Cardie, Claire, "Empirical Methods in Information Extraction", AI Magazine, vol. 18, No. 4, © 1997, pp. 65-79.*

* cited by examiner

METHOD AND APPARATUS FOR ASSESSING SIMILARITY BETWEEN ONLINE JOB LISTINGS

BACKGROUND OF THE INVENTION

1. Field of the Invention

The invention relates to pre-processing of data for a production database. More particularly the invention relates to a method and apparatus for identifying duplicate and near-duplicate content or documents for a production database.

2. Description of Related Technology

In the early days of the Internet, information retrieval tools were rudimentary, consisting of text-based search tools such as ARCHIE, GOPHER, and WAIS. In the 1990's the World-wide Web emerged and the first graphical web browsers, MOSAIC and NETSCAPE became available. Internet use started to increase dramatically among individual citizens, who could connect to the network from their own homes via modem over a telephone line. With the growth of the Internet and the corresponding increase in the user population, there arose the need for more sophisticated information retrieval tools. To satisfy this need, powerful search engines, such as WEBCRAWLER (INFOSPACE, INC., BELLEVUE Wash.), ALTAVISTA (YAHOO, INC. SUNNYVALE Calif.) and GOOGLE (GOOGLE, INC., MOUNTAIN VIEW Calif.) were developed. These search engines had to be able to sift through enormous numbers of duplicate documents and avoid returning them in search results in order to provide users the most useful information. Unfortunately, as the web has continued to expand, the volume of available information has mushroomed. While search engines, such as GOOGLE, remain highly effective, the sheer volume of information they return in response to a query can overwhelm the user. Thus, the user experience has, in spite of the power of these search engines, begun to deteriorate.

In response to the proliferation of online information, vertical search tools have arisen to serve highly specific information needs. A vertical search tool may be thought of as a specialized, domain-specific search engine that mines data for one narrow niche of the market place. Post-retrieval, a vertical search tool may classify and process the information and present it in a way that renders the information easier and simpler to use and consume.

The Internet has been recognized as an excellent medium for disseminating job and employment information and has rapidly become an important tool for employers and jobseekers alike. Professional associations often provide job listings for their members and large commercial jobs databases such as MONSTER (MONSTER WORLDWIDE, INC., NEW YORK N.Y.) enjoy great popularity. Employment experts generally counsel job-seekers to use as many modalities as possible to identify and make contact with potential employers. It is also a very common practice for employers seeking employees to use different recruiting modalities: recruiters, Internet-based job bulletin boards, newspaper ads and so on. A result of this practice is that there may exist a large number of announcements, ads and descriptions for a given job on the Internet that are duplicates or near-duplicates of each other. Furthermore, the jobseeker, in order to manage a job search effectively, must find a way to manage jobs information from a multiplicity of sources. For this reason, producers of employment information, in order to serve their market most effectively, must find a way to limit or eliminate the frustratingly large number of duplicate and near-duplicate job listings that are bound to turn up in a job search.

The prior art provides various methods of assessing similarity between documents in order to identify duplicates and near duplicates in a group of documents. Approaches are often based on "signatures" wherein a document signature—a digest of the document—is created, and then pair-wise comparison of signatures is made to identify documents that are similar to each other.

For example, one approach uses "shingling" to represent a document as a series of numeric encodings for an n-term text span—a "shingle." A document sketch is created by keeping every $m^{th}$ shingle or the shingle with the smallest hash value. There is also a super-shingling technique that creates meta-sketches to reduce computational complexity. Pairs of documents that share a large number of shingles are considered to be near-duplicates of each other. Such approaches suffer the disadvantage of performing poorly on small documents, such as web-published job listings. Additionally, reduction of the volume of data in this manner can result in relatively non-similar documents being identified as duplicates.

Another approach also determines near-duplicate documents based on fingerprints. Fingerprints are generated for each of a fixed number of lists by extracting elements from the documents, hashing each of the extracted elements, and determining which of the number of lists is to be populated with a given part. If the fingerprints of two documents in any list are the same, the documents are duplicates or near-duplicates.

There is a disadvantage to approaches that rely exclusively on a comparison of fingerprints to identify duplicates and near duplicates. Documents having identical fingerprints may, in fact not be duplicates or near duplicates. Thus, a unique document may be identified as a duplicate or near-duplicate of another document based on a non-unique fingerprint. In a case where duplicates and near-duplicates are being identified to remove them from a repository, the content contained in the mistakenly-identified and removed document is then lost. Additionally, such approaches are computationally intensive.

There also exist feature-based approaches to duplicate detection. For example, one approach uses collection statistics to identify terms occurring in the entire collection of documents that are useful for duplicate document detection. Such an approach employs a premise that removal of very infrequent and very common terms results in good document representations for identifying duplicates.

A still further approach uses document length as a binning method to reduce the number of duplicate candidates. Keywords from different parts of a seed document are used to query documents within the bin to reduce the number of duplicate candidates even further. Then, a similarity measure such as Kullback-Leibler divergence is used to do pair-wise comparison to determine near-duplicates.

Job listings typically contain a fair amount of noise—content unrelated to the job listing itself. For example, job listings often contain advertising or promotional information for the search engine itself. Additionally, the formatting and layout of job listings varies greatly from one job site to another. For example, on one site, the actual description of the job may be placed in the middle portion of the listing; a description of the very same job from another site may include promotional material in the middle portion of the document. Furthermore, online job listings are often fairly short in length. The wide variation in the information content, layout and formatting of job listings from one site to another, coupled with their typically short length, pose special challenges for identifying and removing duplicates and near-duplicates that conventional duplicate removal stratagems have difficulty meeting.

SUMMARY OF THE INVENTION

A vertical search engine for job listings retrieves online job listings in a number of ways—for example, by means of feeds or software agents such as spiders or crawlers. As job listings are retrieved, they are pre-processed and duplicate records identified prior to indexing and storage in a production database for the search engine.

Job metadata, such as title, company name, and location are parsed and normalized. Inter-source and intra-source hash values are calculated for each job description from the normalized metadata and/or the body of the description and the values compared. Job listings having identical intra-source hash values are judged to be duplicates of each other. In this case, no further processing is needed, except for possible removal of the duplicate entry so that the database contains only unique records.

Job descriptions whose intra-source hash values do not match, but whose inter-source hash values do match are judged to be duplicate candidates and subject to further processing.

A list of suffixes is generated for each such duplicate candidate. The suffixes for each duplicate candidate are stored to a data structure that facilitates rapid search, such as a suffix array. Records having at least a predetermined threshold number of contiguous words in common are judged to be duplicates of each other. On the basis of this comparison, duplicate records are identified before the data set is processed for storage to a production data base.

DETAILED DESCRIPTION

General search engines like GOOGLE are designed to provide all types of general information to all types of users. General search engines are typically programmed to perform "horizontal searches"—broad searches on a wide variety of topics. Because of this horizontal search approach, users in search of particular information must often sift through hundreds, possibly thousands of hits in order to locate information relevant to their query, leading to frustration and poor user satisfaction.

Vertical search engines have arisen as a solution to the shortcomings of general search engines. A vertical search engine is a specialized search engine that mines data for one narrow niche of the market place, such as jobs. Jobs information is a niche that is especially suited to vertical search. There are many, many, online sources of jobs information: large job boards like MONSTER, community bulletin boards, listservs and message boards, professional organizations, employer web sites, and so on. Additionally, jobs information tends to be found in information silos, which compounds the difficulty of retrieving and managing it effectively. Accordingly, a vertical search engine for jobs information integrates jobs information from a wide range of sources, rendering the task of retrieving and managing the information most useful to a particular job seeker considerably less formidable.

Figure 1:
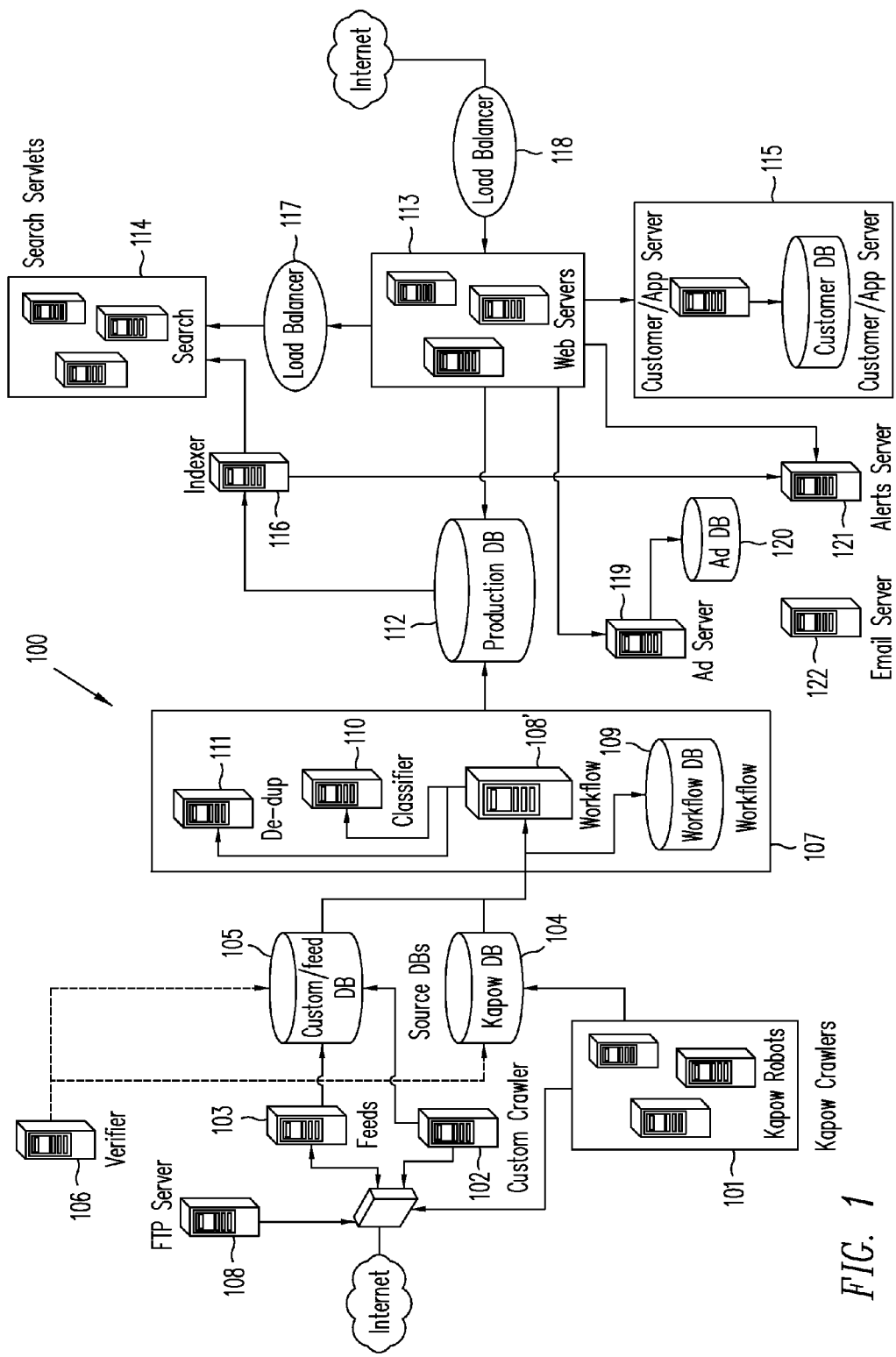
FIG. 1 provides a diagram of an architecture for a vertical search engine for online job listings.

FIG. 1 shows an architectural diagram of a vertical search engine for online job descriptions. At a high level, an embodiment of the invention (1) identifies jobs advertised on the Internet, or other publicly-accessible data network and retrieves the identified job listings; (2) parses and stores the job information, indexes the individual jobs so that they are easily searchable and by means of a deduplication process, assures that an end user does not see duplicate jobs when searching; and (3) returns job announcements as specified by an end user executing a search for job information.

Identifying and Retrieving Job Information

An embodiment of the invention uses one or more of a variety of search technologies to locate and retrieve job information. As shown in FIG. 1, an embodiment of the invention includes a custom crawler module 102. Custom crawlers may be developed for sites having a very large number of jobs posted, or for multiple sites that use the same posting format across a large number of properties. For example, a job posting service might service newspapers all across the United States. All of the newspapers, although each has a distinct URL, use the same format to post their jobs. In cases such as this, a custom crawler is developed to retrieve jobs from those sites that are under the common format of all of these newspaper sites.

Additionally, an embodiment of the invention includes at least one robot module 101. Robots are software programs written especially to crawl web sites looking for structured job data. The jobs, fielded according to a predetermined layout, are then saved in a source database 104 for robot For example, an embodiment of the invention employs a robot technology provided by KAPOW TECHNOLOGIES A/S, Hørsholm D K. However, other search robots are compatible with the invention. The particular choice of robot technology herein described is exemplary and is not intended to limit the scope of the invention.

An embodiment of the invention also includes a feeds module 103. Feeds are another source of job data. Third parties are provided the capability to upload files containing lists of job listings. Typically, the file is written in a markup language such as, for example, XML (extensible Markup Language). One embodiment of the invention provides an FTP server 108, so that the third party provider can readily transmit the files. Alternatively the system operator can retrieve the files from the third party provider's site. As shown in FIG. 1, feed data and custom crawler data are saved in custom/feed source database 105. Other configurations for the source databases are possible; for example, data from all sources could be written to a single source database.

An embodiment of the invention accesses the Internet and retrieves jobs data from behind a firewall 110.

An embodiment of the invention provides a verifier 106 in order to maintain the quality of the job data retrieved. The verifier algorithmically samples a portion of the jobs retrieved and visits the original URL from which the job was retrieved and determines whether the job is fresh or should be expired. Jobs marked for expiration are expired from the system during a subsequent pass through the system workflow.

Enrichment/Workflow

Once the jobs are on the system, a workflow module 107 subjects the jobs to further processing with the ultimate goal of improving the job search experience for the job seeker. Workflow and enrichment include one or more of the following processing tasks:

normalization of job location;

normalization of employer name; and enrichment, both of job location and employer name, wherein additional data is appended to these entities. For example, the employer name is enriched by appending information about the employer in question.

In addition to the above processing, the workflow module 107 may also include a de-duplication sub-module 111 and a classification sub-module 110 The deduplication module is described in greater detail herein below. A workflow database 109 maintains the state of workflows and workflow activities. A workflow server 108' coordinates and schedules workflows and workflow activities. After the processing in the workflow module 107 is complete, the job data is saved to a production database 112.

An indexing module 116 is provided to index the individual job listings, allowing rapid searching by jobseekers. An embodiment of the invention uses, for example, an open-source java-based indexing and search technology to create an index on a set of highly utilized fields. Such fields may include, for example, dates related to the job listing, such as date posted, the last time the ad was seen; employer name, company specific data, source of the ad, and so on.

Job-seekers gain access to the system 100 by means of a client, such as, for example, a web browser communicatively coupled to a web server 118 via a publicly-accessible data network such as the Internet. As shown in FIG. 1, the system 100 includes a plurality of web servers and a load balancer 118 for routing traffic to the web servers in a manner that uses system resources in an optimal manner. After a web server 113 receives the job-seeker's query it routes the query to one of a plurality of search servers or servlets 114. A load balancer 117 routes traffic between the web servers 113 and the search servlets 114 to allocate system resources in an optimal manner. Via the indexer 116, the servlet 114 executes the jobseeker's search in the production database 112. Following completion of the search, the servlets 114, by way of the web servers 113 return the result of the jobseeker's search.

An ad server 119 and ad database 120 give the system 100 the capability of providing a venue for third party advertising.

A customer/application server 115 includes a customer database. The customer/application server is provided to manage and store user accounts. Additionally, having executed a search, the customer/application server allows the job seeker to save the search so that it can be run again at another time.

An embodiment of the system 100 may also include an alerts server 121 and an email server 122. In this way, the job seeker, having run a search can elect the option of having regular alerts emailed to the jobseeker alerting him or her of new jobs that match the jobseeker's criteria.

Figure 2:
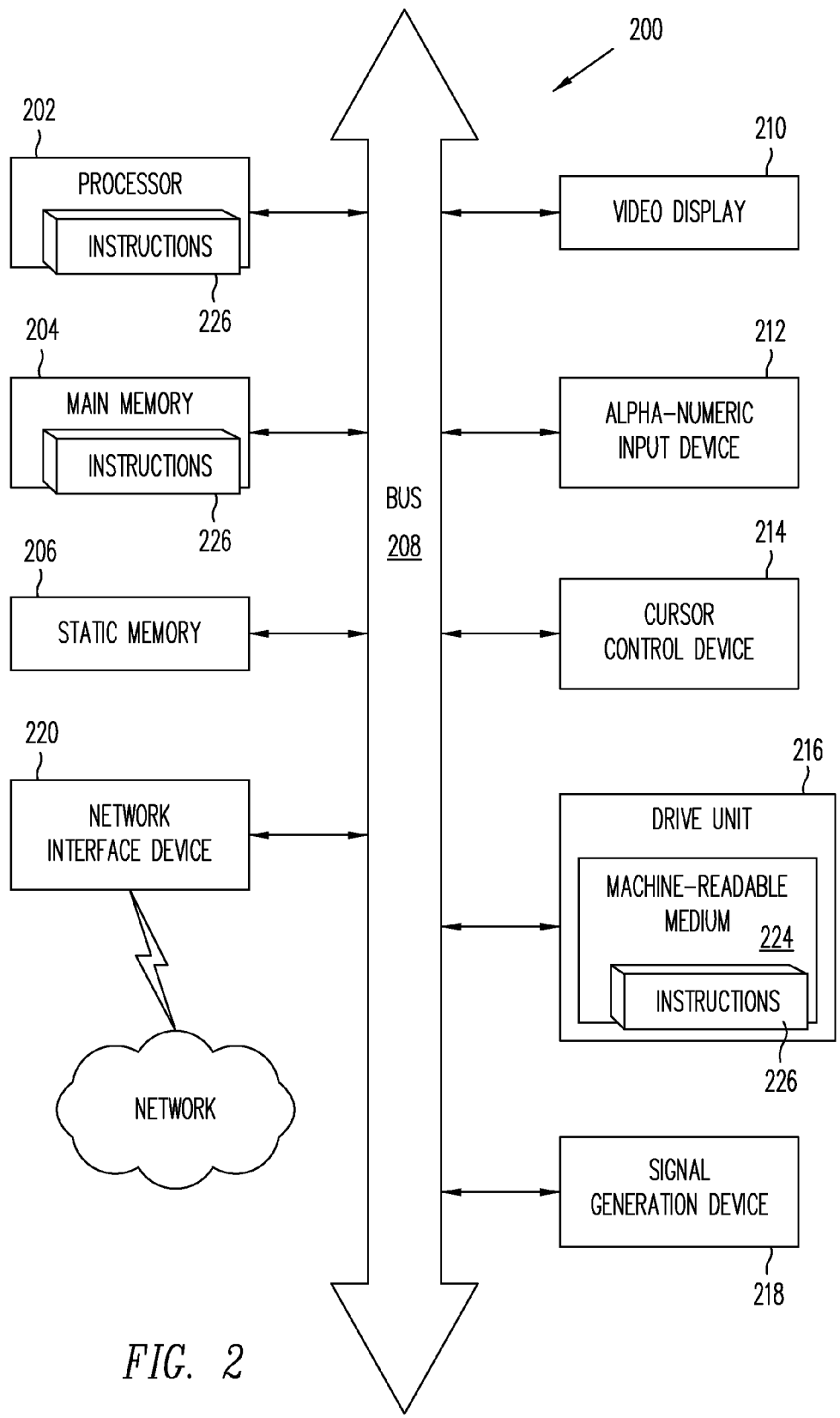
FIG. 2 is a diagrammatic representation of a machine in the exemplary form of a computer system within which a set of instructions may be executed.

FIG. 2 shows a diagrammatic representation of a machine in the exemplary form of a computer system 200 within which a set of instructions, for causing the machine to perform any one of the methodologies discussed hereinbelow, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 200 includes a processor 202, a main memory 204 and a static memory 206, which communicate with each other via a bus 208. The computer system 200 may further include a video display unit 210, e.g. a liquid crystal display (LCD) or a cathode ray tube (CRT). The computer system 200 also includes an alphanumeric input device 212, e.g., a keyboard, a cursor control device 214, e.g. a mouse, a disk drive unit 216, a signal generation device 218, e.g. a speaker, and a network interface device 220.

The disk drive unit 216 includes a machine-readable medium 224 on which is stored a set of instructions, i.e. software, 226 embodying any one, or all, of the methodologies described hereinbelow. The software 226 is also shown to reside, completely or at least partially, within the main memory 204 and/or within the processor 202. The software 226 may further be transmitted or received via the network interface device 220.

In contrast to the system 200 discussed above, a different embodiment of the invention uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments of this invention may be used as or to support software programs executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM), magnetic disk storage media; optical storage media; flash memory devices; electrical, optical, acoustical or other form of propagated signals, e.g. carrier waves, infrared signals, digital signals, etc.; or any other type of media suitable for storing or transmitting information.

Figure 3:
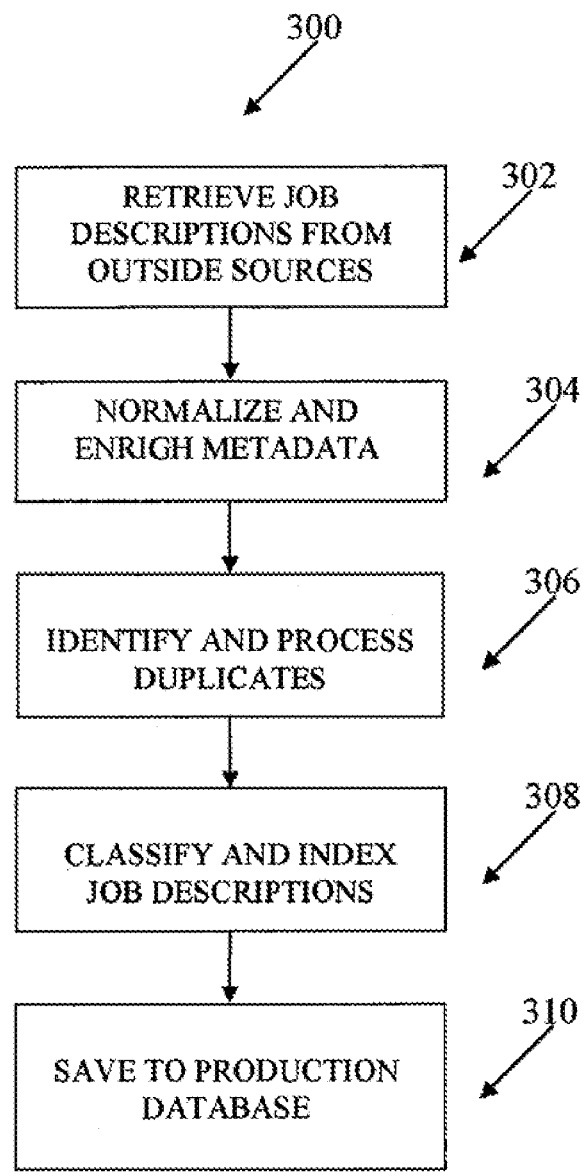
FIG. 3 is a block diagram illustrating workflow for the vertical search engine of FIG. 1.

FIG. 3 provides a workflow diagram of a process 300 embodied in the vertical search engine depicted in FIG. 1. In general the process 300 includes one or more of the following steps:

job descriptions are retrieved from a variety of external sources (302);

metadata for each job description are parsed, normalized, and optionally, enriched (304);

duplicate job listings are identified, and optionally, processed (306);

the job listings are classified and indexed (308); and the classified and indexed job listings are saved to a production database (310).

The job listings are first retrieved 302 from one or more outside sources. In one embodiment of the invention, the job listings are received from outside sources as feeds.

An embodiment of the invention employs one or more software agents such as custom crawlers, autocrawlers and bots. Custom crawlers are software agents that can be configured to retrieve a particular type of information from a configurable group of sources. For example, the invention may include an autocrawler configured to crawl the websites of a group of newspapers to retrieve job listings from those newspapers. Autocrawlers are a type of software agent that typically crawls the web in a more random fashion than a custom crawler. Like the custom crawler, the autocrawler is configurable to retrieve a specific type of information. For example, in the case of the invention, jobs information. More particularly, a software agent such as a crawler can be configured to crawl the web for a particular type of job listing— software engineers, for example.

The vertical search engine can retrieve job listings from a number of different outside source types, XML feeds for example. In the case of software agents, a software agent can be configured to crawl almost any type of information source on the web, jobs sites, the classified ads of online newspapers, bulletin boards, message boards or listservs.

After the job listings are retrieved, the metadata associated with each job listing are normalized and enriched 304. The metadata for the description first undergo a process of normalizaton, wherein the metadata is converted to canonical forms. For example, if the employer was identified as "GE" in one job listing, and "General Electric" in another job listing, they would both likely be normalized to "General Electric Company." The job location can be normalized in similar fashion. For example, if one job listing gave the location as "Mtn. View, Calif." and another gave only the zip code "94043," they would both be normalized to "Mountain View, Calif." After the metadata are normalized, they may further under go a process of enrichment. For example, additional information may be provided about the employer: the line of business, the type of ownership, total revenue, company size, and so on. In the case of location, additional information about the locale may be provided, such as population and other demographic information. Other pre-processing steps and enhancements to the job listing and its metadata may occur to the ordinarily-skilled practitioner and are within the spirit and scope of the invention.

Following normalization and enrichment, the job listings undergo a process of duplicate detection 306. As previously described, it is an exceedingly common practice among employers, when they are recruiting, to use a variety of channels and media. For example, the employer may run print ads, and advertise a job on a job board such as MONSTER, a bulletin board such as CRAIGSLIST (CRAIGSLIST, INC., SAN FRANCISCO Calif.), and many others. A vertical search engine for jobs may receive jobs from any or all of these online sources, in which case, there would be duplicate job listings in the database, unless the duplicates are identified so that they are not displayed to the user. A process for identifying duplicates that incorporates a process for assessing similarity of job listings is described in greater detail hereinbelow. Conventionally, within the art of duplicate document detection, a document is considered to be a duplicate of another document only if it is identical to the other document. Documents having the same or similar content, but which are formatted or organized differently are generally considered to be near-duplicates. For the purpose of the invention, a duplicate of one job listing is any job listing that describes the same job as the first job listing, whether or not they are identical. The two job listings may be duplicates in the conventional sense. However, within the context of the invention, near-duplicates are considered duplicates also.

The job listings are classified and indexed 308. The ordinarily-skilled practitioner may recognize a multitude of classification and indexing approaches that would be suitable for the practice of the invention. All are within the spirit and scope of the invention.

Finally, the job listings are saved to a production database 310 for the vertical search engine.

Figure 4:
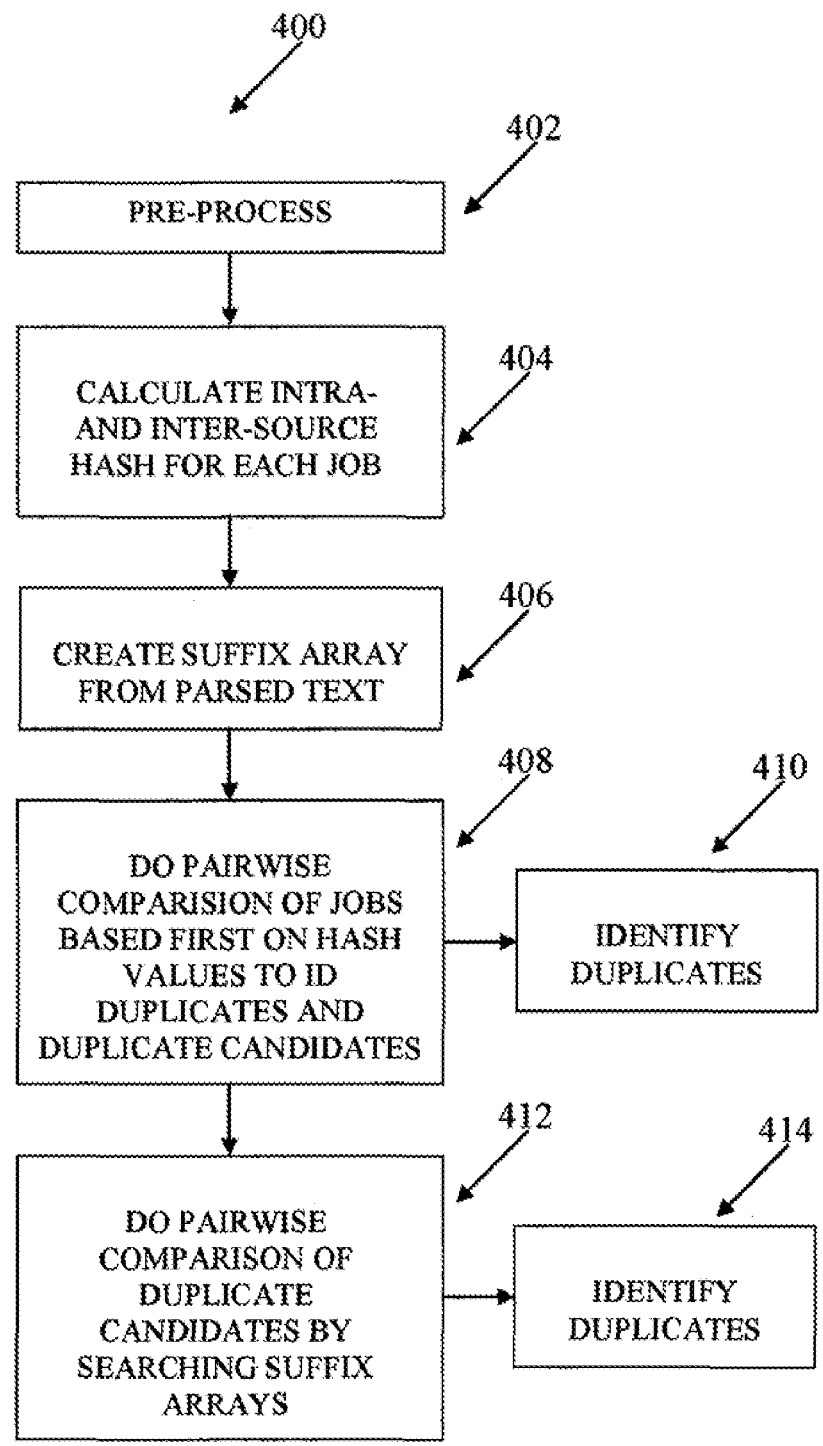
FIG. 4 is a block diagram of a process for identifying duplicate job descriptions for the vertical search engine of FIG. 1.

Turning now to FIG. 4, shown is a block diagram of a process for identifying duplicate job listings 400. The process 400 generally includes one or more of the following steps:
  preprocessing the raw job listings (402);
  calculating an inter-source and intra-source hash value for each job listing (404);
  writing a vector of word ID's from the body of the job listing to a suffix array (406);
  doing a first pair-wise comparison of jobs based on hash values to identify duplicates and duplicate candidates (408);
  identifying duplicates identified in the first pair-wise comparison (410);
  doing a second pair-wise comparison of duplicate candidates by searching their respective suffix arrays (412); and
  identifying duplicates from the second pair-wise comparison (414).

Figure 5:
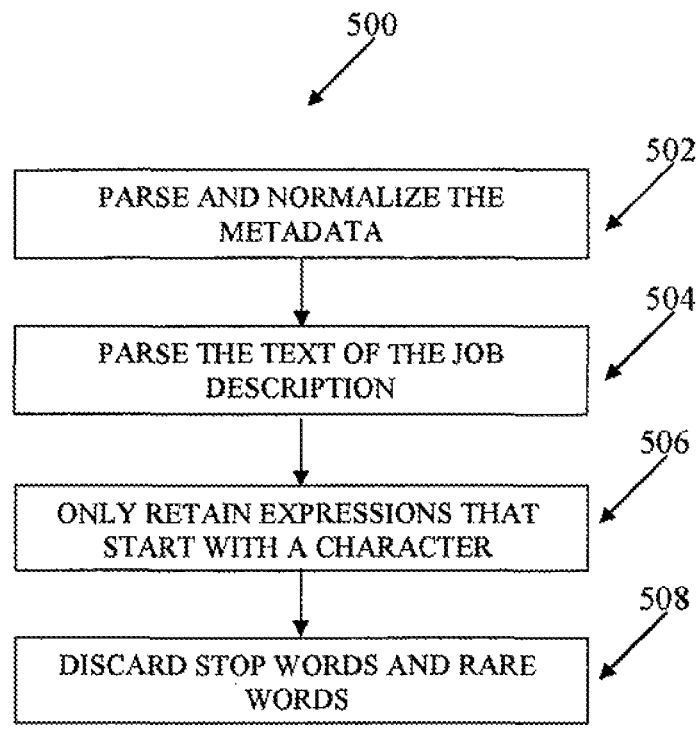
FIG. 5 is a block diagram of a sub-process for pre-processing retrieved job descriptions.

The raw job listings are first pre-processed 402. FIG. 5 shows a block diagram of a sub-process 500 for preprocessing job listings. As previously described, pre-processing the job listings includes the steps of parsing and normalizing the metadata 502. In addition, the text in the body of the job listing may also be parsed 504. After parsing, the data from the body of the job listing is scrubbed by removing expressions that do not begin with a letter 506. Additionally, predefined stop words and rare words are eliminated 508 from the body of the job listing. Rare words are those that occur at a frequency in the document that is below that of a configurable level.

Figure 6:
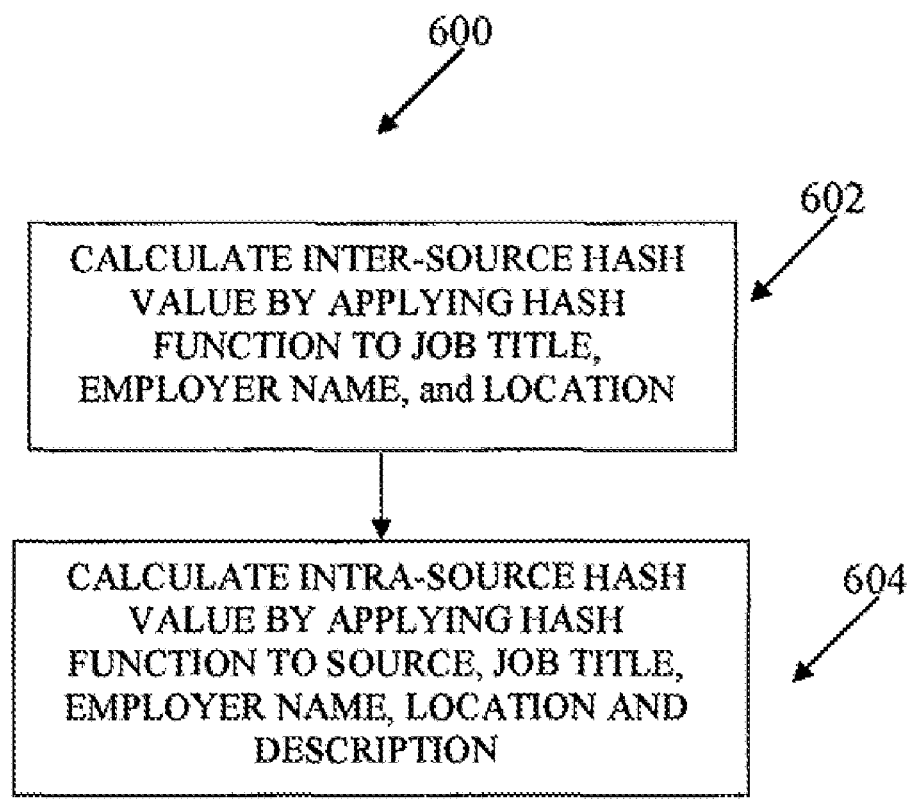
FIG. 6 is a block diagram of a sub-process for calculating hash values for online job descriptions.
Figure 7:
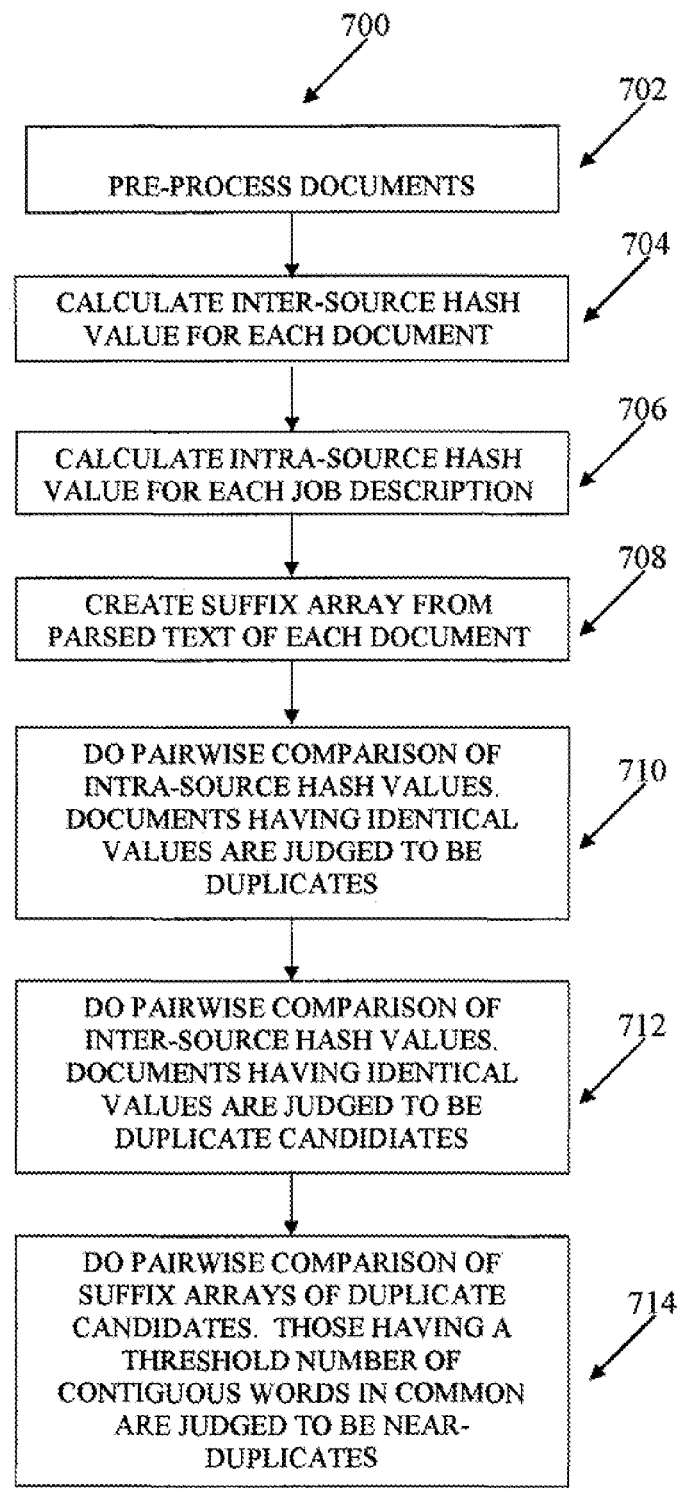
FIG. 7 is a block diagram of a process for assessing similarity between documents.

After pre-processing, inter-source and intra-source hash values are calculated for each job listing 404. FIG. 6 shows a block diagram of a sub-process 500 for calculating such hash values. The inter-source hash is calculated 602 by applying a hash function to the normalized metadata of the job listing, including job title, employer name, and job location. An intra-source hash is calculated 604 by applying a hash function to the metadata as above, and additionally, the source from where the job listing was obtained and the parsed and scrubbed description.

It will be recognized that a hash value is an identifying value produced by performing a numerical operation—a hash function—on a data item. The value uniquely identifies the data item but requires far less storage space. For this reason, a processing apparatus can compare hash values more quickly than it can compare the longer data items themselves. Ideally, a hash function is designed so that, ideally, no two different objects ever hash to the same value. In actual fact, no hash function can produce such a result. Thus, the effectiveness of a hash function is judged by how effectively it minimizes "collisions," wherein two different expressions end up having the same hash value. Within the duplicate detection art, two expressions having the same hash value are considered to be duplicates. Thus, within the context of the invention, inter-source and intra-source hash values may be seen as a species of signature.

Intra-source duplicates are duplicates within a single job source and inter-source duplicates are duplicates across sources. It is to be appreciated that intra-source duplicate checking is preferably rigid in order to minimize the number of false positives that are detected with that particular filter. It is important to note that, for the intra-source hash, the employer name does not undergo the additional pre-processing that the employer name undergoes for calculating the inter-source hash. Because of the additional inputs, the intra-source signature is somewhat stricter than the inter-source signature, so the resulting signature is considerably more rigid than the inter-source signature. This is so because the intra-source signature is used to detect duplicates within a particular source. That is to say, duplicate jobs that are extracted from an individual site, or duplicate jobs within a job feed. Ideally, there should be no intra-source duplicates because the software agents and feeds ideally provide only unique job listings. However, there are certain sources where the same job is posted, but with minor variations in the description hundreds or even, in the case of large feeds, thousands of times. Thus, keeping the number of falsely unique job listings as low as possible requires a stricter algorithm.

Across job sources—the inter source duplicates—restrictions can be relatively more relaxed.

An embodiment of the invention employs the MD5 algorithm to calculate both inter-source and intra-source hash values. The MD5 algorithm takes as input a message of arbitrary length and produces as output a signature or "message digest" of the input.

It is to be appreciated that, while the hash function used to create both values is the same, the inputs into the hashing function are different for the inter-source and intra-source duplicate signatures.

One embodiment of the invention uses any of the following inputs to calculate the inter-source hash:
normalized employer name;
job title;
city; and
state.

The employer name is normalized as described above in connection with the description of the pre-processing sub-process. Additionally, common tokens and corporate designations, such as ""LLC,"" ""LLP,"" ""Corp.,"" "Inc." and so on; as well as white spaces and abbreviated names; for example "natl." and "national" and "bros." and "brothers" are normalized. This is done to increase the amount of tolerance for variations in company name when looking for duplicate jobs in different sources. Thus, a job from one source with a company name of "Hewlett Packard", and a job from another source with a company name of "Hewlett Packard Corporation" are still caught as duplicates, as long as the other fields being fed into the hashing function are the same.

The preceding description is meant to be illustrative and is not intended to limit the invention. Other methods of calculating an inter-source hash that may occur to the ordinarily-skilled practitioner are within the scope of the invention.

One embodiment of the invention uses any of the following inputs to calculate the intra-source hash:
un-normalized employer name;
job title;
city;
state;
source; and
description.

The 'source' field indicates where the job listing is obtained from. This is set, for example, to a job board name, if the job came from a secondary job posting source, or to an employer name if it was received directly from the employer or extracted directly from the employers web site.

As previously described, the description, or body, of the job listing is pre-processed to remove any tokens or expressions that start with numeric characters. This is done to remove expressions such as dates or job codes, which contribute little to the similarity assessment.

The preceding description is meant to be illustrative and is not intended to limit the invention. Other methods of calculating an intra-source hash that may occur to the ordinarily-skilled practitioner are within the scope of the invention. For example, in one embodiment of the invention, use of the employer name to calculate hash values is optional.

The MD5 function is advantageous in that it is reasonably robust and the hashes it generates are not very large—around 32 bytes. Additionally, it is fast and relatively sensitive and MOS libraries are easily located for most languages.

Additional embodiments of the invention employ different approaches to generating the signatures. Approaches that have the characteristics of being relatively quick, in order to generate sums on the fly, being able to generate a sum or signature that is not very large and being able to detect minor variations when needed are well-suited to the invention, One embodiment of the invention incorporates an algorithm employing a character frequency analysis to generate the signatures. A character frequency analysis is performed on one or more fields from the job listing. Preferably, the description is used because it has more text to compare than shorter fields do. Following the frequency analysis, a predetermined portion of the distribution is taken and used as the signature. In one embodiment, the central ⅓ is used as the signature.

An additional embodiment of the invention employs a word frequency analysis, analogous to the character frequency analysis, to generate the signatures.

Additionally, other hash functions are suitable for the practice of the invention. Among these may be,
RS hash function;
JS hash function;
PJW hash function;
ELF hash function;
BKDR hash function;
SDBM hash function;
DJB hash function;
DEK hash function; and
AP hash function.

As shown in FIG. 4, after calculating the inter-source and intra-source hash, the system software does a pair-wise comparison 408 based on the hash values. As explained above, collisions between intra-source hash values are strongly indicative that the two corresponding documents are duplicates because the intra-source hash is calculated from a relatively complete sample of the data contained in the record. Because of this relatively complete data sample, if two hash values collide, there is a high likelihood that the two job listings are exact duplicates. Accordingly, in a case where the intra-source hash values of two job listings collide, the two are judged to be duplicates. In this case, one of the pair could be identified as the master document to be displayed to the user. Alternatively, one of the pair could be removed 410, leaving one unique job listing out of the pair in the pool of job listings to be classified and indexed.

In a case where the inter-source hash values collide, but the intra-source values do not collide, the pair are judged to be duplicate candidates. Because the inter-source hash value is calculated from the job listing metadata, collision between inter-source hash values is suggestive that the two job listings are duplicates, but further processing is needed to determine if they are actual duplicates. In such case, the text of each duplicate candidate job listing is used to create a suffix array 406 for each duplicate candidate record.

A suffix array is a data structure designed for efficient searching of a large text. More particularly, suffix arrays are often employed to do pair-wise comparisons between blocks of text or text strings. For example, suffix arrays are often used to do pair-wise comparisons between gene sequences. The data structure is simply an array containing pointers to the text suffixes sorted in alphabetical order.

Each suffix is a string starting at a certain position in the text and ending at the end of the text. Searching a text can be performed by binary search using the suffix array. Methods of constructing and searching suffix arrays are commonly known. Provided below is an example showing suffix array construction.

Suppose it is desired to construct a suffix array for the sample text "Beijing is my home."

First, as in Table 1, index points are assigned to the sample text. The index points specify positions where search can be performed. In the example, index points are assigned word by word. Thus, at a later time, the sample text can be searched at any positions.

TABLE 1

| Index point | Word |
|---|---|
| 1 | Beijing |
| 2 | is |
| 3 | my |
| 4 | home |

Remembering that a suffix is a string starting at a certain point in the text and ending at the end of the text, the suffixes found in the sample text are, home;
my home;
is my home; and
Beijing is my home.

Next, the index points are sorted according to their corresponding suffixes, in alphabetical order. The correspondence between the index points and the suffixes looks like:

TABLE 2

| Suffix | Index point |
|---|---|
| Beijing is my home | 1 |
| is my home | 2 |
| my home | 3 |
| home | 4 |

After sorting:

TABLE 3

| Sorted Suffix | Index point |
|---|---|
| Beijing is my home | 1 |
| home | 4 |
| is my home | 2 |
| My home | 3 |

Finally, the resulting index points become the suffix array for the sample text, as shown below.

| 1 | 4 | 2 | 3 |

The suffix arrays having been created, the text of the job listings is searched using the suffix arrays in order to do a pair-wise comparison of one job listing with another 412. Search of the sample text can be performed by binary search using the created suffix array. Pair-wise search of samples of text to identify duplicates is a conventional technique. One will readily recognize that construction of a suffix array for a job listing creates a vector of the words of the text of the job listing. The goal is to determine the intersection of the vectors between two documents, using commonly-known algorithms to search the text of a pair of job listings, It has been determined empirically, that, if a pair of duplicate candidates, upon being searched by means of suffix arrays, is found to share a substantial block of consecutive words, there is a high likelihood that the pair contains duplicates. As previously noted, conventional duplicate detection algorithms tend to work poorly when applied to short documents. The invention remedies this shortcoming by requiring a precise match between pairs of duplicate candidates when either one or both of the duplicate candidates contains less than a threshold number of words. An embodiment of the invention provides the capability of configuring the threshold below which the text must match precisely. In an exemplary embodiment of the invention, the word threshold is configured to be thirty words. Thus, when comparing a pair of duplicate candidates wherein either or both of the pair contain less than thirty words, the system software only labels them duplicates if their text is found to be precisely identical. In the case of longer documents, the two are judged to be duplicates if they share a block of text made up of at least the threshold number of consecutive words. Thus, in the exemplary embodiment, a first duplicate candidate numbering, for example, sixty-five words and a second numbering, for example, ninety-two words are judged to be duplicates if they share at least thirty consecutive words. The result of this pair-wise comparison of each of the duplicate candidates with each other is that additional duplicates are identified. Among a plurality of duplicates, one is identified as the master document to be displayed to the user. In another embodiment of the invention, one from the plurality of duplicates is retained, with the other documents removed from the data set.

EXAMPLE

The example lists two near-duplicate jobs crawled from two job sites. When the job listings are compared, it is apparent that job 1 adds much noisy information at both the top and bottom of the document.

TABLE 4

| Job 1 crawled from St. Louis At Work | |
|---|---|
| Source | St. Louis At Work |
| Company name | Yahoo |
| Location | Sunnyvale, CA |
| Title | Technical Yahoo, Sr |
| Description | Find a Job. Job Details. If you want to remember this job or apply at a later time, click "Save job" to save it to your personal folder. Technical Yahoo, Sr Job No. RX1000011033 Location US —Sunnyvale Job Function ENGINEERING/INFO. SYSTEMS Description Yahoo! Strategic Data Solutions/Data Mining and Research Group (SDS/DMR) is looking for an outstanding data mining researcher. This individual should enjoy understanding customer needs, selecting, modifying or building appropriate tools or methodologies, and providing end-to-end solutions for diversified challenging data mining and data research projects. Following criteria will be used in selection: * Expertise and desire to work with industrial data * Experience in exploratory data analysis and data mining |

TABLE 4-continued

Job 1 crawled from St. Louis At Work process * Knowledge of data mining methods * Ph.D. in Machine Learning, Data Mining, Statistics, Artificial Intelligence, or a related field * Good communication and ability to understanding business requirements * Team spirit and ability to aggressively execute independently * Creativity and passion in achieving the goals * Software Development skills Copyright © 2005 Yahoo! Inc. All rights reserved.

The inter-source hash for job 1 was computed by combining company name, location and title as follows:

Hash("Yahoo"+"Sunnyvale, Calif."+"Technical Yahoo, Sr")="a78bdea0d1443bcfbaf90c917e2c47f"

TABLE 5

Job 2 was crawled at Yahoo.com

| Source | Yahoo! |
|---|---|
| Company name | Yahoo |
| Location | Sunnyvale, CA |
| Title | Technical Yahoo, Sr |
| Description | Yahoo! Strategic Data Solutions/Data Mining and Research Group (SDS/DMR) is looking for an outstanding data mining researcher. This individual should enjoy understanding customer needs, selecting, modifying or building appropriate tools or methodologies, and providing end-to-end solutions for diversified challenging data mining and data research projects. Following criteria will be used in selection: Expertise and desire to work with industrial data Experience in exploratory data analysis and data mining process Knowledge of data mining methods Ph.D. in Machine Learning, Data Mining, Statistics, Artificial Intelligence, or a related field Good communication and ability to understanding business requirements Team spirit and ability to aggressively execute independently Creativity and passion in achieving the goals Software Development skills |

Similarly, the inter-source hash is computed as follows.

Hash("Yahoo"+"Sunnyvale, Calif."+"Technical Yahoo, Sr") "a78bdea0d1443bcfbaf0cb917e2c7f"

Because job 2 has the same hash key as job 1, job 2 appears to be a duplicate candidate for job 1.

The algorithm proceeds to do pair-wise comparison for the two job listings to determine if the two jobs share a large number of consecutive words. Using the suffix array, the algorithm quickly finds the identical consecutive word block from both jobs, indicated in Tables 4 and 5 in bold type. Therefore, job 2 and job 1 are duplicates of each other.

An additional embodiment of the invention employs the foregoing processes and sub-processes in a more general manner in a method for assessing similarity between pairs of documents 700. Thus, the principles of the invention are readily generalized to include other types of documents besides job listings for a vertical search engine database. Briefly, the steps of the method 700 include:

pre-processing the documents 702;

calculating an inter-source hash value for each document 704;

calculating an intra-source hash value for each document 706;

creating a suffix array from the parsed text from each document 708;

doing a pair-wise comparison of intra-source hash values. Documents having identical intra-source hash values are judged to be duplicates 710;

doing a pair-wise comparison of inter-source hash values. Documents having identical values are judged to be duplicate candidates 712; and;

doing a pair-wise comparison using suffix arrays of duplicate candidates. Those having a threshold number of contiguous words in common are judged to be near-duplicates 714.

It should be noted that, in the case of the above method, a more conventional definition of "duplicate" is utilized. Thus, only exact duplicates are judged to be duplicates. Duplicate candidates of sufficient similarity are judged to be near-duplicates. The invention is not limited to comparison of documents. The principles of the invention can also be applied to segments of text and other data such as blocks of text or text strings such as gene sequences.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

The invention claimed is:

1. A method of identifying semantically duplicate job listings that describe a same job, where the duplicate job listings are retrieved from a plurality of online sources, the method comprising the machine-implemented steps of:

preprocessing each job listing, comprising:

automatically parsing each retrieved job listing to thereby identify in the parsed job listing, a corresponding job title, a corresponding employer name and a corresponding job location;

automatically normalizing the identified employer name and job location to canonical forms;

automatically enriching at least one of the normalized employer name and normalized job location by adding additional data regarding the normalized data item; and automatically scrubbing descriptive body text of each retrieved and parsed job listing by eliminating rare words and stop words and expressions that do not begin with a letter;

automatically determining sameness-indicating signatures for the respective job listings, where the signatures are shorter in length than the job listings they were derived from and where substantially identical signatures indicate likelihood of job listings that describe a same job;

automatically testing the signatures for collisions and among the job listings that have signature collisions, identifying job listings as duplicates of each other if they share at least a predetermined amount of identical text; and automatically segregating job listings that have been identified as duplicates so that one serves as a unique master job listing for storage in a production database and for being searched through by job seeking queries of job seekers.

2. The method of claim 1, wherein a rare word is automatically identified through automated word frequency analysis as a word having a frequency in a job listing body that is less than a predefined minimum frequency.

3. A machine-implemented method of de-duplicating semantically equivalent data sets that describe a same job where job listing data sets each have at least one of a job title, an employer identification and a job location and where listings of same a job describe the job as being offered by a same employer at a same location, the method comprising:

(a) automatically retrieving job listing data sets from a variety of pre-identified data-providing sources where one or more of the sources list identification of the employer differently or list identification of the job location differently or list the job title differently in their respective job listing data sets;

(b) automatically parsing the respective job listing data sets retrieved from the one or more pre-identified data-providing sources to thereby identify in the respectively retrieved data sets at least one of the identification of the employer or of the job location or of the job title; and (c) (i) automatically normalizing at least one of the identified identification of the employer and the identified listing of the job location and the identified listing of the job title so that after normalization, for each data set that was normalized, the originally differently listed ones of the corresponding identification of the employer or of the corresponding complete listing of the job location or of the corresponding job title, are instead expressed identically in accordance with predefined canonical forms for the corresponding identification of the employer or the corresponding complete listing of the job location or the corresponding job title; and (ii) automatically enriching each normalized data set by providing additional information regarding the normalized one of the identified identification of the employer, the identified listing of the job location and the identified listing of the job title.

4. The method of claim 3, wherein the retrieved data sets each further includes a listing body which describes the job in more detail and the method further comprises:

creating a suffix array for each listing body that is part of a duplicate candidate;

using said suffix arrays to identify listing bodies that are likely to describe a same job; and identifying as duplicates those of the suffix-array identified listing bodies that share a predetermined minimum number of identical contiguous words.

5. The machine-implemented method of claim 3 and further comprising:

(d) automatically generating for each retrieved data set, at least a first hash signal that is a function of at least one of the automatically normalized identification of the employer and the normalized listing of the job location and the normalized listing of the job title.

6. The method of claim 5, wherein the normalized data sets and corresponding hash signals are stored in a production database.

7. The machine-implemented method of claim 5 wherein the retrieved data sets each further includes a listing body which describes the job in more detail and the method further comprises:

(e) automatically parsing the respectively retrieved data sets to thereby identify in the respective data sets, the corresponding listing bodies; and (f) automatically generating for each retrieved and parsed data set, a scrubbed version of the correspondingly identified listing body by automatically deleting during the scrubbing, tokens or expression within the listing body that begin with a numeric character; and wherein the automatically generated at least first hash signal is further a function of the scrubbed listing body of the correspondingly retrieved and parsed data set.

8. The machine-implemented method of claim 7 wherein the first hash signal is a function of the original, not-normalized identification of the employer.

9. The machine-implemented method of claim 8 wherein the data sets are retrieved from a variety of pre-identified data-providing sources and the method further comprises:

(g) automatically generating for each retrieved data set, a second hash signal that is not a function of the listing body but is a function of the automatically normalized identification of the employer; and (h) using the second hash signals to automatically perform inter-source hash comparisons, where the inter-source hash comparisons include pair-wise comparisons of second hash signals derived from fetched data sets of two different ones of the pre-identified data-providing sources.

10. The machine-implemented method of claim 9 and further comprising:

(i) using the first hash signals to automatically perform intra-source hash comparisons, where the intra-source hash comparisons include pair-wise comparisons of first hash signals derived from fetched data sets of a same one of the pre-identified data-providing sources.

11. The machine-implemented method of claim 5 wherein said first hash signal is a function of at least the normalized listing of the job location and of the normalized listing of the job title.

12. The machine-implemented method of claim 11 wherein said first hash signal is further a function of at least the normalized identification of the employer.

13. The machine-implemented method of claim 12 wherein said first hash signal is further a function of an automatically normalized and/or automatically scrubbed and/or automatically enriched version of a job-describing text body found in the retrieved job listing data set.

14. The machine-implemented method of claim 3 wherein the job listing data sets include those that are retrieved by a server that crawls through plural internet sites.

15. The machine-implemented method of claim 3 wherein the job listing data sets include those that are retrieved as job listing feeds encoded according to a predefined markup language.

16. The machine-implemented method of claim 3 wherein, before de-duplication, the retrieved job listings are tested for freshness and nonfresh listings are automatically deleted and not included in testing for semantic duplication.

17. The machine-implemented method of claim 3 wherein said automatic parsing of the respective job listing data sets further operates to identify in the respectively retrieved data sets, a descriptive text body that describes the job in more detail than do the parsing-identified identification of the employer, the job location or the job title.

18. The machine-implemented method of claim 3 wherein said automatic normalizing operates to normalize at least the corresponding full listing of the job location and the corresponding full listing of the job title.

* * * * *